(12) United States Patent
Ono

(10) Patent No.: US 10,361,570 B2
(45) Date of Patent: Jul. 23, 2019

(54) CHARGING/DISCHARGING CONTROL CIRCUIT AND BATTERY APPARATUS INCLUDING VOLTAGE OR CURRENT DETECTION FOR SECONDARY BATTERIES

(71) Applicant: SII Semiconductor Corporation, Chiba-shi, Chiba (JP)

(72) Inventor: Takashi Ono, Chiba (JP)

(73) Assignee: ABLIC INC., Chiba (JP)

( * ) Notice: Subject to any disclaimer, the term of this patent is extended or adjusted under 35 U.S.C. 154(b) by 279 days.

(21) Appl. No.: 15/241,957

(22) Filed: Aug. 19, 2016

(65) Prior Publication Data

US 2017/0155255 A1 Jun. 1, 2017

Related U.S. Application Data

(60) Provisional application No. 62/261,474, filed on Dec. 1, 2015.

(51) Int. Cl.
*H02J 7/00* (2006.01)

(52) U.S. Cl.
CPC .......... *H02J 7/0026* (2013.01); *H02J 7/0016* (2013.01); *H02J 7/0019* (2013.01); *H02J 7/0029* (2013.01); *H02J 7/0063* (2013.01); *H02J 2007/0039* (2013.01); *H02J 2007/0067* (2013.01)

(58) Field of Classification Search
CPC ...... H02J 7/0026; H02J 7/0016; H02J 7/0019; H02J 7/0029; H02J 7/0063; H02J 2007/0039; H02J 2007/0067

USPC .......................................................... 320/134
See application file for complete search history.

(56) References Cited

U.S. PATENT DOCUMENTS

| | | | | |
|---|---|---|---|---|
| 2006/0186859 A1* | 8/2006 | Fujikawa | ............. | G01R 31/025 320/134 |
| 2013/0285612 A1* | 10/2013 | Okuda | .................. | H02J 7/0016 320/126 |
| 2014/0239896 A1* | 8/2014 | Takeshita | .............. | H02J 7/0024 320/117 |
| 2016/0020629 A1* | 1/2016 | Lee | ..................... | H01M 10/482 320/164 |

FOREIGN PATENT DOCUMENTS

JP 2001-185228 A 7/2001

* cited by examiner

*Primary Examiner* — Nathaniel R Pelton
(74) *Attorney, Agent, or Firm* — Brinks Gilson & Lione

(57) ABSTRACT

To provide a charging/discharging control circuit and a battery apparatus which control charging/discharging of secondary batteries connected in parallel and are high in safety while being low in cost. A charging/discharging control circuit and a battery apparatus are each configured to be provided with a voltage detection portion which detects a difference in voltage between secondary batteries connected in parallel or detects that backward currents are made to flow through charging/discharging control switches which are respectively connected to the parallel-connected secondary batteries and control charging/discharging thereof.

6 Claims, 4 Drawing Sheets

CHARGING/DISCHARGING CONTROL CIRCUIT AND BATTERY APPARATUS INCLUDING VOLTAGE OR CURRENT DETECTION FOR SECONDARY BATTERIES

RELATED APPLICATIONS

This application claims priority under 35 U.S.C. § 119(e) to Provisional Application No. 62/261,474 filed on Dec. 1, 2015, the entire content of which is hereby incorporated by reference.

BACKGROUND OF THE INVENTION

1. Field of the Invention

The present invention relates to a charging/discharging control circuit and a battery apparatus which are high in safety.

2. Description of the Related Art

A battery apparatus provided with a plurality of secondary batteries connected in parallel causes the following malfunctions where one of the secondary batteries is internally short-circuited.

Since the internally short-circuited secondary battery is lowered in internal resistance and output voltage, currents flow in an opposite direction from other normal secondary batteries connected in parallel therewith. The backward currents have the possibility of becoming large currents because the internal resistance of the internally short-circuited secondary battery is low.

In order to solve the above-described problems, the related art battery apparatus is equipped with a current detection circuit provided in series with each secondary battery. For example, when the current detection circuit detects that the direction in which a current flows is opposite to the flowing direction of a current in each normal secondary battery, a discharging path to the current in the backward direction is cut off (refer to, for example, Patent Document 1).

[Patent Document 1] Japanese Patent Application Laid-Open No. 2001-185228

SUMMARY OF THE INVENTION

The related art battery apparatus is however accompanied by a drawback that since the current detection circuit is provided in series with each secondary battery, a loss is increased due to a resistor for current detection in the current detection circuit.

The present invention has been invented to solve the above-described problems and provides a charging/discharging control circuit and a battery apparatus both having high safety, which prevent lowering of an output voltage of a secondary battery.

In order to solve the related art problems, a charging/discharging control circuit and a battery apparatus of the present invention are configured as follows:

The charging/discharging control circuit and the battery apparatus are each configured to be provided with a voltage detection portion which detects a difference in voltage between secondary batteries connected in parallel or detects that backward currents are made to flow through charging/discharging control switches which are respectively connected to the parallel-connected secondary batteries and control charging/discharging thereof.

An effect is brought about in that according to the charging/discharging control circuit of the present invention, a loss due to a resistor for current detection of a current detection circuit is not generated, and a charging/discharging control circuit and a battery apparatus both high in safety can be provided.

DETAILED DESCRIPTION OF THE PREFERRED EMBODIMENTS

Figure 1:
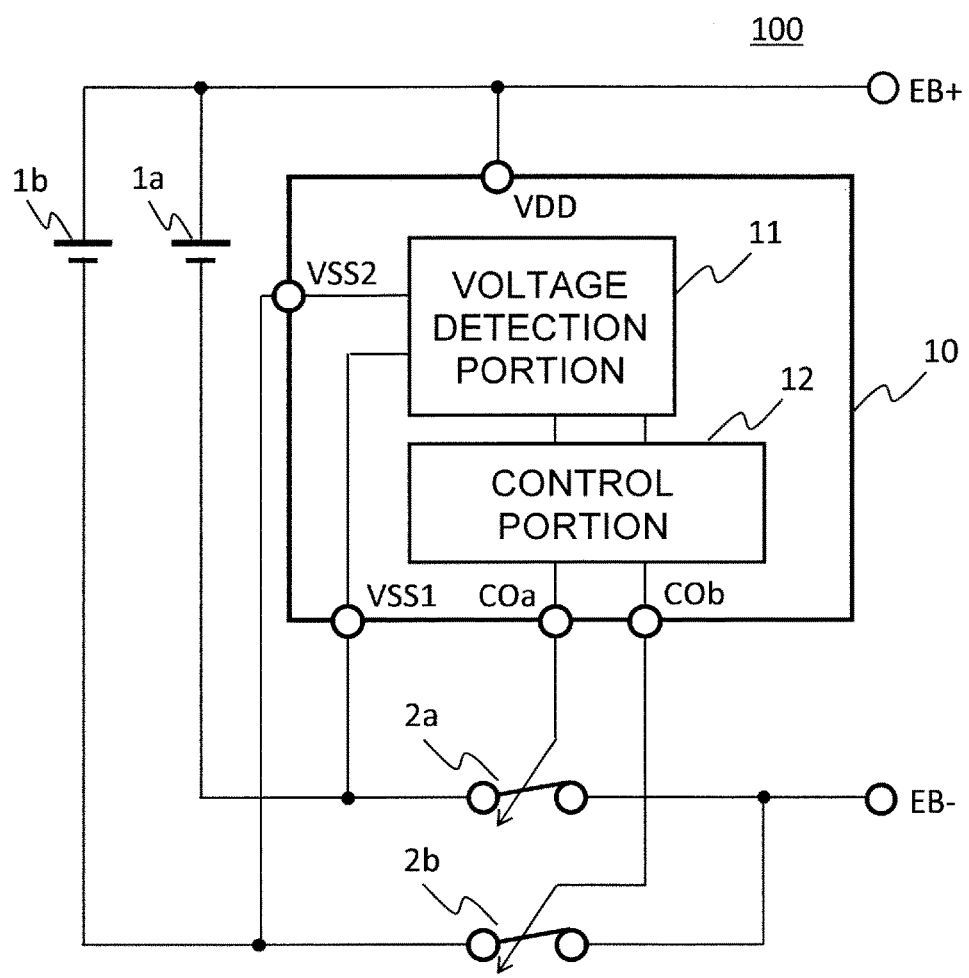
FIG. 1 is a block diagram of a battery apparatus according to a first embodiment of the present invention.

FIG. 1 is a block diagram of a battery apparatus according to a first embodiment of the present invention.

The battery apparatus 100 is equipped with secondary batteries 1a and 1b, charging/discharging control switches 2a and 2b, and a charging/discharging control circuit 10. The charging/discharging control circuit 10 is equipped with at least a voltage detection portion 11, and a control portion 12.

The secondary battery 1a is connected between an external terminal EB+ and an external terminal EB− through the charging/discharging control switch 2a. The secondary battery 1b is connected between the external terminal EB+ and the external terminal EB− through the charging/discharging control switch 2b. The charging/discharging control circuit 10 has a power supply terminal VDD connected to positive electrode terminals of the secondary batteries 1a and 1b and the external terminal EB+, a power supply terminal VSS1 connected to a negative electrode of the secondary battery 1a, a power supply terminal VSS2 connected to a negative electrode of the secondary battery 1b, a control signal output terminal COa connected to a control terminal of the charging/discharging control switch 2a, and a control signal output terminal COb connected to a control terminal of the charging/discharging control switch 2b.

When a difference in voltage between the power supply terminal VSS1 and the power supply terminal VSS2 becomes greater than or equal to a prescribed value, the voltage detection portion 11 detects that the secondary battery is internally short-circuited, and outputs a detection signal therefrom. In response to the detection signal of the voltage detection portion 11, the control portion 12 controls the charging/discharging control switch 2a or the charging/discharging control switch 2b to prevent a current from flowing from the normal secondary battery to the internally short-circuited secondary battery.

Figure 2:
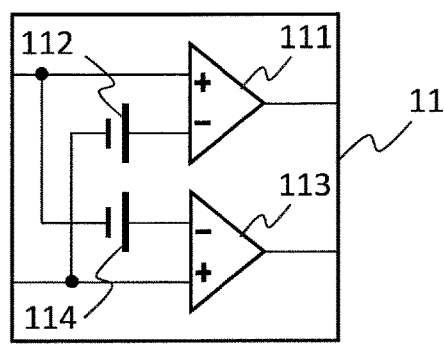
FIG. 2 is a circuit diagram illustrating one example of a voltage detection portion of the battery apparatus according to the first embodiment.

FIG. 2 is a circuit diagram illustrating one example of the voltage detection portion 11 of the battery apparatus 100 according to the first embodiment.

The voltage detection portion 11 is equipped with comparators 111 and 113 and voltage sources 112 and 114. Each of the voltage sources 112 and 114 outputs a voltage having a prescribed value for detecting the internal short circuit of the secondary battery.

The comparator 111 has a non-inversion input terminal + to which the power supply terminal VSS2 is connected, and an inversion input terminal − to which the power supply terminal VSS1 is connected through the voltage source 112.

The comparator 113 has a non-inversion input terminal + to which the power supply terminal VSS1 is connected, and an inversion input terminal − to which the power supply terminal VSS2 is connected through the voltage source 114.

The voltage detection portion 11 detects in the following manner that the secondary battery is internally short-circuited.

Since the secondary battery 1a and the secondary battery 1b are approximately equal in voltage if they are normal, the power supply terminal VSS1 and the power supply terminal VSS2 are made approximately equal in voltage. Thus, since the comparators 111 and 113 are higher in voltage at their inversion input terminals − than at their non-inversion input terminals +, they output signals of L level each indicative of non-detection.

Here, when the voltage of the power supply terminal VSS1 becomes lower than the voltage of the power supply terminal VSS2 by a prescribed voltage outputted by the voltage source 112, the voltage of the non-inversion input terminal + becomes higher than the voltage of the inversion input terminal −, so that the comparator 111 outputs a signal of H level indicative of detection. That is, the voltage detection portion 11 detects the internal short circuit of the secondary battery 1a. Further, in response to a detection signal outputted from the comparator 111, the control portion 12 outputs a signal for turning OFF the switch 2a from the control signal output terminal COa to the control terminal of the charging/discharging control switch 2a.

Further, when the voltage of the power supply terminal VSS2 becomes lower than the voltage of the power supply terminal VSS1 by a prescribed voltage outputted by the voltage source 114, the voltage of the non-inversion input terminal + becomes higher than the voltage of the inversion input terminal −, so that the comparator 113 outputs a signal of H level indicative of detection. That is, the voltage detection portion 11 detects the internal short circuit of the secondary battery 1b. Further, in response to a detection signal outputted from the comparator 113, the control portion 12 outputs a signal for turning OFF the switch 2b from the control signal output terminal COb to the control terminal of the charging/discharging control switch 2b.

As described above, according to the battery apparatus 100 of the present embodiment, since the voltage detection portion 11 is provided which compares the voltages of the power supply terminal VSS1 and the power supply terminal VSS2 with each other to thereby detect that the secondary battery is internally short-circuited, it is possible to provide a battery apparatus high in safety without reducing the output voltage of the secondary battery.

Incidentally, the voltage detection portion 11 illustrated in FIG. 2 is not limited to the circuit therefor if it is capable of detecting the difference in voltage between the power supply terminal VSS1 and the power supply terminal VSS2 becomes greater than or equal to the prescribed value and outputting the detection signal therefrom.

Further, the voltage detection portion 11 may detect that the difference in voltage between the power supply terminal VDD and the power supply terminal VSS1 or the power supply terminal VSS2 becomes less than or equal to the prescribed value or may detect that the difference in voltage between the power supply terminal VDD and the power supply terminal VSS1 and the difference in voltage between the power supply terminal VDD and the power supply terminal VSS2 becomes greater than or equal to the prescribed value.

Further, although the description has been made in such a manner that the charging/discharging control circuit 10 turns OFF the charging/discharging control switch connected to the secondary battery in which the internal short circuit is detected, the charging/discharging control circuit 10 may be configured so as to turn OFF all charging/discharging control switches.

Figure 3:
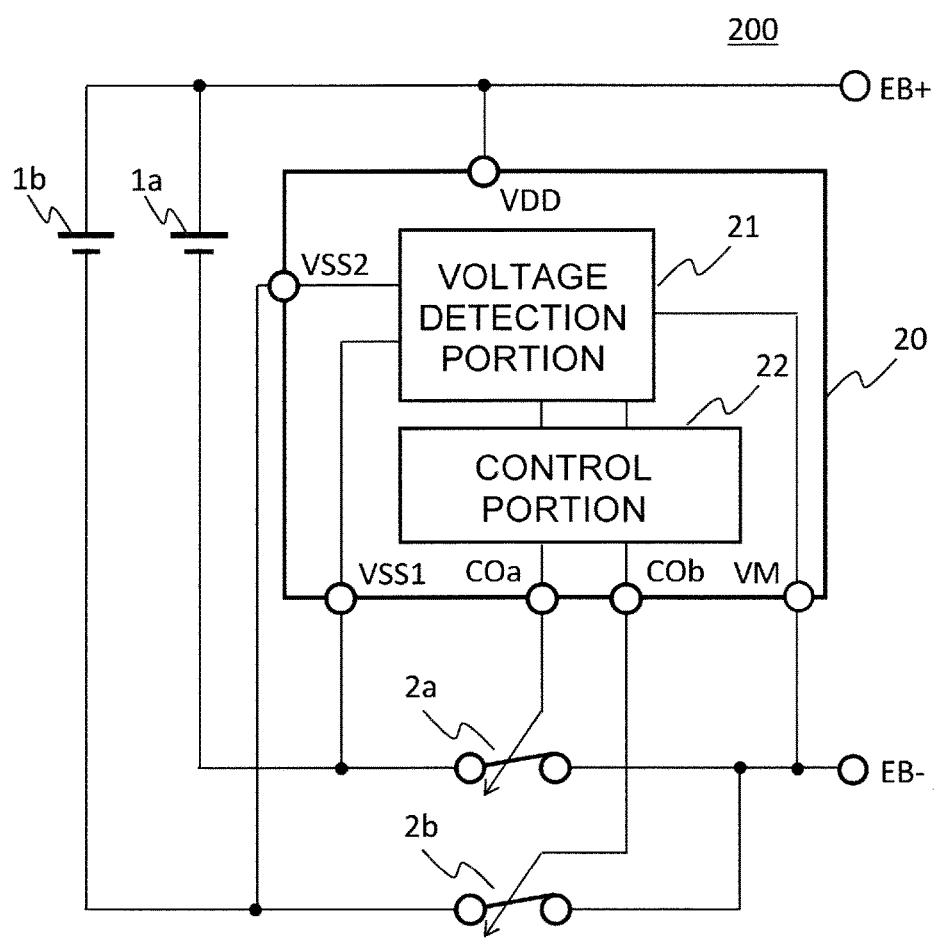
FIG. 3 is a block diagram of a battery apparatus according to a second embodiment of the present invention.

FIG. 3 is a block diagram of a battery apparatus according to a second embodiment of the present invention.

The battery apparatus 200 is equipped with at least a charging/discharging control circuit 20 having a voltage detection portion 21 and a control portion 22.

The charging/discharging control circuit 20 has a power supply terminal VDD connected to positive electrode terminals of secondary batteries 1a and 1b and an external terminal EB+, a power supply terminal VSS1 connected to a negative electrode of the secondary battery 1a, a power supply terminal VSS2 connected to a negative electrode of the secondary battery 1b, an overcurrent detection terminal VM connected to an external terminal EB−, a control signal output terminal COa connected to a control terminal of a charging/discharging control switch 2a, and a control signal output terminal COb connected to a control terminal of the charging/discharging control switch 2b.

When the directions of currents flowing through the charging/discharging control switch 2a and the charging/discharging control switch 2b are detected from the voltage between the power supply terminal VSS1 and the overcurrent detection terminal VM and the voltage between the power supply terminal VSS2 and the overcurrent detection terminal VM, and the directions thereof are different from each other, the voltage detection portion 21 detects that the secondary battery is internally short-circuited, and outputs a detection signal therefrom. In response to the detection signal of the voltage detection portion 21, the control portion 22 controls the charging/discharging control switch 2a or the charging/discharging control switch 2b to prevent a current from flowing from the normal secondary battery to the internally short-circuited secondary battery.

Figure 4:
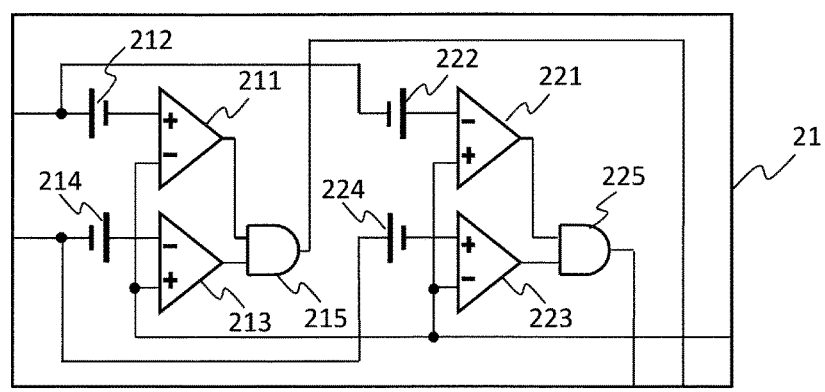
FIG. 4 is a circuit diagram illustrating one example of a voltage detection portion of the battery apparatus according to the second embodiment.

FIG. 4 is a circuit diagram illustrating one example of the voltage detection portion 21 of the battery apparatus 200 according to the second embodiment.

The voltage detection portion 21 is equipped with comparators 211, 213, 221, and 223, and voltage sources 212, 214, 222, and 224. Each of the voltage sources 212 and 214 outputs a voltage having a prescribed value for detecting the internal short circuit of the secondary battery 1b. Each of the voltage sources 222 and 224 outputs a voltage having a prescribed value for detecting the internal short circuit of the secondary battery 1a.

The comparator 211 has a non-inversion input terminal + to which the power supply terminal VSS2 is connected through the voltage source 212, and an inversion input terminal − to which the overcurrent detection terminal VM is connected. The comparator 213 has a non-inversion input terminal + to which the overcurrent detection terminal VM is connected, and an inversion input terminal − to which the power supply terminal VSS1 is connected through the voltage source 214.

The comparator 221 has a non-inversion input terminal + to which the overcurrent detection terminal VM is connected, and an inversion input terminal − to which the power supply terminal VSS2 is connected through the voltage source 222. The comparator 223 has a non-inversion input terminal + to which the power supply terminal VSS1 is connected through the voltage source 224, and an inversion input terminal − to which the overcurrent detection terminal VM is connected.

Thus, the comparator 211 outputs a signal of H level when a current flows through the charging/discharging control switch 2b in a charging direction. The comparator 213 outputs a signal of H level when a current flows through the charging/discharging control switch 2a in a discharging direction. The comparator 221 outputs a signal of H level when a current flows through the charging/discharging control switch 2b in the discharging direction. The comparator 213 outputs a signal of H level when a current flows through the charging/discharging control switch 2a in the charging direction.

The voltage detection portion 21 detects in the following manner that the secondary battery is internally short-circuited.

If the secondary battery 1a and the secondary battery 1b are normal, the charging/discharging current flows through the charging/discharging control switch 2a and the charging/discharging control switch 2b in the same direction. Thus, one of the comparators 211 and 213 outputs a signal of H level and the other thereof outputs a signal of L level. An AND circuit 215 outputs a signal of L level. Further, one of the comparators 221 and 223 outputs a signal of H level and the other thereof outputs a signal of L level. An AND circuit 225 outputs a signal of L level.

Here, when the secondary battery 1a is internally short-circuited, a current flows from the secondary battery 1b to the secondary battery 1a, the charging/discharging control switch 2a, and the charging/discharging control switch 2b. Further, since the voltage of the non-inversion input terminal + becomes higher than the voltage of the inversion input terminal − when the voltage of the power supply terminal VSS1 becomes higher than a prescribed voltage outputted from the voltage source 224 as seen from the voltage of the overcurrent detection terminal VM, the comparator 223 outputs a signal of H level indicative of detection. Furthermore, since the voltage of the non-inversion input terminal + becomes higher than the voltage of the inversion input terminal − when the voltage of the power supply terminal VSS2 becomes lower than a prescribed voltage outputted from the voltage source 222 as seen from the voltage of the overcurrent detection terminal VM, the comparator 221 outputs a signal of H level indicative of detection. That is, the voltage detection portion 21 detects the internal short circuit of the secondary battery 1a. In response to a detection signal outputted from the voltage detection portion 21, the control portion 22 outputs a signal for turning OFF the switch 2a from the control signal output terminal COa to the control terminal of the charging/discharging control switch 2a.

Also, when the secondary battery 1b is internally short-circuited, a current flows from the secondary battery 1a to the secondary battery 1b, the charging/discharging control switch 2b, and the charging/discharging control switch 2a. Further, since the voltage of the non-inversion input terminal + becomes higher than the voltage of the inversion input terminal − when the voltage of the power supply terminal VSS1 becomes lower than the voltage of the overcurrent detection terminal VM by a prescribed voltage outputted from the voltage source 214, the comparator 213 outputs a signal of H level indicative of detection. Furthermore, since the voltage of the non-inversion input terminal + becomes higher than the voltage of the inversion input terminal − when the voltage of the power supply terminal VSS2 becomes higher than the voltage of the overcurrent detection terminal VM by a prescribed voltage outputted from the voltage source 212, the comparator 211 outputs a signal of H level indicative of detection. That is, the voltage detection portion 21 detects the internal short circuit of the secondary battery 1b. In response to a detection signal outputted from the voltage detection portion 21, the control portion 22 outputs a signal for turning OFF the switch 2b from the control signal output terminal COb to the control terminal of the charging/discharging control switch 2b.

As described above, according to the battery apparatus 200 of the present embodiment, the voltage detection portion 21 is provided which detects that the secondary battery is internally short-circuited due to the currents flowing through the charging/discharging control switch 2a and the charging/discharging control switch 2b being in opposite directions. It is therefore possible to provide a battery apparatus high in safety without reducing the output voltage of each secondary battery.

Incidentally, if the voltage detection portion 21 illustrated in FIG. 4 is capable of detecting that the currents flowing through the charging/discharging control switch 2a and the charging/discharging control switch 2b are in the opposite directions and outputting the detection signal therefrom, the voltage detection portion 21 is not limited to the circuit therefor.

Further, although the description has been made in such a manner that the charging/discharging control circuit 20 turns OFF the charging/discharging control switch connected to the secondary battery in which the internal short circuit is detected, the charging/discharging control circuit 20 may be configured so as to turn OFF all charging/discharging control switches.

What is claimed is:

1. A single charging/discharging control circuit that controls charging/discharging of first and second secondary batteries connected between first and second external terminals, the charging/discharging control circuit comprising:
   a first power supply terminal having first electrodes of the first and second secondary batteries connected thereto;
   a first second-power supply terminal having a second electrode of the first secondary battery connected thereto;
   a second second-power supply terminal having a second electrode of the second secondary battery connected thereto; and
   a voltage detection portion, directly connected to the first second-power supply terminal and to the second second-power supply terminal and configured to detect a difference between a voltage of the first second-power supply terminal and the second second-power supply terminal, and where a voltage of the second second-power supply terminal is greater than or equal to a prescribed voltage, the voltage detection portion outputs a detection signal to a control portion indicating that the first secondary battery or the second secondary battery are internally short-circuited.

2. A battery apparatus comprising:
   the single charging/discharging control circuit according to claim 1 connected in parallel to the first and second secondary batteries; and
   first and second charging/discharging control switches connected to the control portion and between the first and second secondary batteries and the second external terminal.

3. A charging/discharging control circuit that controls charging/discharging of first and second secondary batteries connected between first and second external terminals, the charging/discharging control circuit comprising:

a first power supply terminal having first electrodes of the first and second secondary batteries are connected thereto;

a first second-power supply terminal having a second electrode of the first secondary battery connected thereto;

a second second-power supply terminal having a second electrode of the second secondary battery connected thereto; and a voltage detection portion that detects that a difference between a voltage of the first power supply terminal and a voltage of the first second-power supply terminal and a difference between the voltage of the first power supply terminal and a voltage of the second second-power supply terminal becomes greater than or equal to a prescribed voltage, and thereby detects that the first secondary battery or the second secondary battery is internally short-circuited.

4. A battery apparatus comprising:

first and second secondary batteries connected between first and second external terminals;

a charging/discharging control circuit according to claim 3 connected in parallel with the first and second secondary batteries; and first and second charging/discharging control switches connected between the first and second secondary batteries and the second external terminal.

5. A charging/discharging control circuit that controls charging/discharging of first and second secondary batteries connected between first and second external terminals, the charging/discharging control circuit comprising:

a first power supply terminal having first electrodes of the first and second secondary batteries connected thereto;

a first second-power supply terminal having a second electrode of the first secondary battery connected thereto;

a second second-power supply terminal having a second electrode of the second secondary battery connected thereto;

a voltage detection terminal that receives a voltage between each of first and second charging/discharging control switches respectively connected to the second electrodes of the first and second secondary batteries, and the second external terminal;

a voltage detection portion that detects that backward currents flow through the first and second charging/discharging control switches by a voltage of the first second-power supply terminal, a voltage of the second second-power supply terminal, and the voltage of the voltage detection terminal, and thereby detects that the first secondary battery or the second secondary battery is internally short-circuited.

6. A battery apparatus comprising:

first and second secondary batteries connected between first and second external terminals;

a charging/discharging control circuit according to claim 5 connected in parallel with the first and second secondary batteries; and first and second charging/discharging control switches connected between the first and second secondary batteries and the second external terminal.

* * * * *